(12) United States Patent
DeMeter (10) Patent No.: US 7,172,676 B2
(45) Date of Patent: Feb. 6, 2007

(54) SYSTEM AND METHOD FOR BONDING AND DEBONDING A WORKPIECE TO A MANUFACTURING FIXTURE

(75) Inventor: Edward C. DeMeter, State College, PA (US)

(73) Assignee: The Penn State Research Corporation, University Park, PA (US)

( * ) Notice: Subject to any disclaimer, the term of this patent is extended or adjusted under 35 U.S.C. 154(b) by 316 days.

(21) Appl. No.: 10/635,791

(22) Filed: Aug. 6, 2003

(65) Prior Publication Data

US 2004/0026023 A1 Feb. 12, 2004

Related U.S. Application Data

(60) Provisional application No. 60/402,145, filed on Aug. 7, 2002.

(51) Int. Cl.
*B27G 11/02* (2006.01)
(52) U.S. Cl. .................. 156/379.6; 156/275.7; 156/380.9; 269/289 R; 269/329
(58) Field of Classification Search ........... 156/247, 156/272.2, 275.7, 344, 379.6, 380.9, 584; 269/289 R, 329
See application file for complete search history.

(56) References Cited

U.S. PATENT DOCUMENTS

| | | | |
|---|---|---|---|
| 3,608,809 A | 9/1971 | Cushman | |
| 3,834,687 A | 9/1974 | Martin et al. | |
| 3,868,118 A | 2/1975 | Hirvi et al. ................. | 279/1 M |
| 3,963,551 A | 6/1976 | Marlinski ................... | 156/295 |
| 4,082,423 A * | 4/1978 | Glista et al. ................ | 385/103 |
| 4,255,216 A | 3/1981 | Conant et al. | |
| 4,356,050 A | 10/1982 | Crivello et al. .......... | 156/273.3 |
| 4,492,513 A | 1/1985 | Weck et al. | |
| 4,536,238 A | 8/1985 | Dischert ..................... | 156/64 |

(Continued)

OTHER PUBLICATIONS

Table 2-5. Photopolymer Systems for SLA and Their Typical Properties, *Stereolithography and other RP&M Technologies*; Paul F. Jacobs, Society of Manufacturing Engineers. ASME Press, 1996, pp. 74, 75.
"Advances in Light Curing Adhesive", Presented at SPIE, SanDiego, CA, Aug. 1, 2001, Paper #444-20, Andrew G. Bachmann, Dymax Corporation.

(Continued)

*Primary Examiner*—Jeff H. Aftergut
*Assistant Examiner*—John L. Goff
(74) *Attorney, Agent, or Firm*—Howard & Howard Attorneys, P.C.

(57) ABSTRACT

A system and a method by which workpieces are bonded to and debond from a manufacturing fixture using a radiation responsive adhesive as a bonding agent. The system includes curing the adhesive agent during loading within seconds, and structurally weakens the adhesive bond during unloading within seconds. During the workpiece loading cycle, an adhesive dispenser deposits radiation responsive adhesive on to a load bearing, light transmittive surface, known as gripper pins. The workpiece is subsequently pushed against the locators, and towards the gripper pins causing the adhesive to interpose between workpiece and gripper pins, curing radiant energy is transmitted through the gripper pins and on to the adhesive to cure adhesive and bond the workpiece to the fixture. Therefore, the bond is structurally weakened or debonded in order to remove the workpiece from the fixture after manufacturing.

21 Claims, 6 Drawing Sheets

U.S. PATENT DOCUMENTS

| | | | |
|---|---|---|---|
| 4,642,221 A | 2/1987 | Hansen et al. | 422/16 |
| 4,685,660 A | 8/1987 | Dillner | |
| 4,695,705 A | 9/1987 | Kulig | 219/354 |
| 4,729,804 A | 3/1988 | Dillner | |
| 4,853,064 A | 8/1989 | Levine | 156/275.5 |
| 5,115,761 A * | 5/1992 | Hood | 118/641 |
| 5,210,926 A | 5/1993 | Newton | |
| 5,423,931 A * | 6/1995 | Inoue et al. | 156/94 |
| 5,624,521 A | 4/1997 | Hed | 156/275.7 |
| 5,947,662 A | 9/1999 | Becker et al. | 409/131 |
| 5,981,361 A | 11/1999 | Yamada | 438/464 |
| 6,073,451 A | 6/2000 | Tarumizu | 62/62 |
| 6,136,141 A | 10/2000 | Glatfelter et al. | 156/380.9 |
| 6,331,080 B1 | 12/2001 | Cole et al. | 385/80 |
| 6,524,433 B2 | 2/2003 | Sweeney | 156/379.6 |
| 6,652,707 B2 | 11/2003 | Ishaug et al. | |
| 2002/0155243 A1 | 10/2002 | Kobe et al. | 428/40.1 |
| 2003/0000624 A1 | 1/2003 | Krajewski et al. | |
| 2005/0000636 A1 | 1/2005 | Geiger et al. | |

OTHER PUBLICATIONS

"Reference Free Part Encapsulation (RFPE): An Investigation of Material Properties and the Role of RFPE in a Taxonomy of Fixturing Systems", *Journal of Manufacturing Systems*, vol. 21/No. 2, 2002, Sung H. Ahn. Paul K. Wright, pp. 101-110.

"The Structure and Mechanical Behavior of Ice," *JOM* 51(2)(1999), Erland M. Schulson, pp. 21-27.

"Rapid Prototyping & Manufacturing—Fundamentals of StereoLithography," *Society of Manufacturing Engineers*, 1992, Paul F. Jacobs, David T. Reid, pp. 25-58, 79-110.

"Effect of Workpiece Surface Topography on the Holding Force In a Electromagnetic Chuck," Paper, The George W. Woodruff School of Mechanical Engineering, George Institute of Technology, Elsevier Science Ltd, 2000, A. Felix, S. N. Melkote.

"Other Workholding Devices," *Materials and Processes in Manufacturing*, Eighth Edition, Prentice Hall, 1997, ISBN 0-02-328621-0, E. Paul DeGarmo, JT Black, Ronald A. Kosher, pp. 838-840.

* cited by examiner

SYSTEM AND METHOD FOR BONDING AND DEBONDING A WORKPIECE TO A MANUFACTURING FIXTURE

CROSS REFERENCE TO RELATED APPLICATIONS

This application claims the benefit of Provisional Application No. 60/402,145, entitled LIGHT ACTIVATED ADHESIVE GRIPPER (LAAG) TECHNOLOGY AND PROCESS filed on Aug. 7, 2002, and which is incorporated herein by reference.

STATEMENT REGARDING FEDERALLY SPONSORED RESEARCH OR DEVELOPMENT

This invention was made partially with U.S. Government support from the National Science Foundation under Contract Number DMII01-25515. The U.S. Government has certain rights in the invention.

BACKGROUND OF THE INVENTION

The present invention relates to work holders, and particularly relates to such devices using radiant energy to bond and debond a radiation responsive adhesive interposed between a workpiece and a fixture.

Fixtures are used in manufacturing practice to locate and hold the workpiece relative to the manufacturing process, assembly process, or inspection process. One of the most demanding manufacturing operations is machining, and will be used as an example. While the configuration of a machining center fixture is typically application specific, nearly all utilize mechanical elements called locators, clamps, and supports. Locators are fixed mechanical elements that are used to position the workpiece relative to the fixture base and ultimately the machining center. Clamps are mechanisms that are used to push the workpiece against a subset of locators. Clamps are typically actuated through the relative turning of a nut and screw, hydraulically, or pneumatically.

Supports are mechanisms that are used to increase the rigidity of the fixture-workpiece system. Supports differ from clamps in that supports are brought into contact with the workpiece with minimal pre-load, and subsequently locked into place. Like clamps, supports may be actuated through the relative turning of a nut and screw, hydraulically, or pneumatically. Because of imperfections in workpiece surfaces, and the necessity to locate the part using only six or less locators, supports are engaged only after the workpiece has been brought into contact with the locators and clamped. In many applications additional clamps are actuated in order to force the workpiece into contact with the supports, and thus increase the pre-load of the fixture on the workpiece.

A typical workpiece loading cycle involves the following steps. The workpiece is brought into contact with the locators. The clamps are actuated and forced into contact with the workpiece. This creates pre-loaded joints between the workpiece, clamps, and a subset of locators. If used, supports are actuated and brought into light contact with the workpiece. Supports are subsequently locked in place. Additional clamps can be actuated to hold the workpiece against a subset of supports. The workpiece and the fixture elements are essentially a single assembled structure.

During the manufacturing cycle, the workpiece is restrained by the actuated clamp forces and the frictional contact forces at the pre-loaded fixture-workpiece joints. The magnitude of the actuated clamp forces is critical. When clamp forces are too small, the workpiece may slip within the fixture during machining. When clamp forces are too large, the workpiece may excessively deform within the fixture prior to machining.

An important property of the fixture-workpiece system is its dynamic stiffness at the workpiece surfaces to be machined. High dynamic stiffness is necessary to insure that the surfaces do not vibrate excessively during the machining process, and are thus free from excessive form errors and chatter marks.

Dynamic stiffness is a direct function of the geometry and elastic modulus of the workpiece, the spatial arrangement of the fixture elements, the geometry and elastic modulus of the fixture elements, and the coefficient of friction between the workpiece and fixture elements. To a much lesser extent, it is also a function of the joint pre-load forces. An important performance measure of a machining fixture is its ability to impart high dynamic rigidity to the fixture-workpiece system while maintaining cutting tool access to the features that need to be machined.

Other important measures include workpiece load time (includes workpiece mounting and the engagement of the clamps and supports), workpiece unload time (includes disengagement of the clamps and supports, workpiece dismounting, and cleaning of debris from the locator and support contact surfaces), flexibility or ability to be reconfigured to hold different parts, and capital cost. Fixture design is very application specific since every machining application differs with respect to workpiece complexity, machined feature tolerances, required material removal rates, required cycle time, and total number of parts produced.

When actuation forces are set properly, it is very rare for workpieces to slip out of a fixture during machining. Additionally, the holding strength of these fixtures is relatively insensitive to the cleanliness of the workpiece. However, the ability of the fixture to locate the workpiece is very sensitive to cleanliness of the workpiece. Also, if automated clamping and support systems are used, workpiece load and unload time can be made relatively short.

The capital cost of a fixture utilizing this technology varies from hundreds of dollars for a precision vise to over sixty-thousand dollars for a fully automated, tombstone-fixture system. Additionally, there are costs for an external source of actuation (hydraulic fluid transmission system, nut runners, etc.).

However, there are several limitations to traditional fixturing techniques. In many applications, fixture elements cannot be placed at strategic locations on the workpiece because the location is inaccessible, impossible to pre-load through clamp actuation, too compliant, and/or will result in significant pre-load deformation of the workpiece if pre-loaded. This results in insufficient dynamic stiffness of the fixture-workpiece system. In turn this leads to problems with forced vibration and chatter during machining or a significant reduction in the material removal rate of the machining process in order to prevent it. In general this problem degrades both productivity and part quality.

Clamp actuation always leads to elastic, pre-load deformation of the workpiece. Clamping forces are rarely monitored in practice and can vary significantly from workpiece to workpiece, especially when manually actuated. In many cases, clamping forces are much larger than is necessary to hold the workpiece. In other cases, clamping forces that are minimally sufficient to hold the workpiece still result in excessive pre-load deformation of the workpiece. In a number of applications, pre-load deformation is sufficiently high by itself to cause machined feature errors to go out of tolerance. In many other cases, the deformation is sufficiently high to significantly stack up with other sources to cause the part to go out of tolerance.

In most applications, the contact area between the workpiece and fixture is very small. The high stresses that result from clamping forces and machining forces can lead to plastic indentation and/or scratching of the workpiece surface at the fixture-workpiece contact regions. This problem effects part quality and can cause the part to fail surface texture tolerances.

Fixture elements, especially clamps, typically block access to the workpiece surfaces that need to be machined. This necessitates extra set ups, which significantly increase the total, lead time for part machining and/or require the expense of extra machine tools, cutting tools, and fixturing. In addition, every set up requires the part to be located with respect to the machine tool. Since this process is always subject to bias error and random error, every additional set up increases the stack of machined feature errors, in particular orientation, position, and profile type errors.

Fixture elements, especially clamps, can obstruct tool paths to surfaces that need to be machined. This frequently results in tool crashes that damage the cutting tool, machine tool, and fixture element. It also results in substantially reduced productivity, as the cutting tool is required to rapid traverse around the fixture elements.

Fixture elements, especially clamps, can lie outside the envelope of the workpiece, and thus occupy area that could otherwise be used to hold other workpieces. This reduces the number of workpieces that are held on a base plate or tombstone. In turn, this significantly increases the per part cycle time associated with cutting tool changes, pallet changes, and workpiece to workpiece rapid traverse time.

The positions of supports must be adjusted over a very small distance (0.001 in–0.005 in.) in order to be brought into contact with the located and clamped workpiece. This requires moving components, whose use degrades the stiffness of the support.

The limitations just described become more apparent as machined feature tolerances become tighter, the geometric complexity of the workpiece increases, workpiece stiffness decreases, or workpiece hardness decreases.

For special applications, alternative fixturing techniques are available to overcome some of the limitations of conventional fixturing. These alternatives include the use of alternative forces to clamp the workpiece and adhesive bonds.

Three commercially available fixturing technologies that use alternative clamping forces that do not rely on mechanical clamps are vacuum chucks, magnetic chucks, and electro-static chucks. In all three fixture types, the clamping forces can be turned on or off instantaneously.

For example, a conventional vacuum chuck, such as models manufactured by Dunham, includes gripper plate perforated with holes/channels. The holes/channels are connected to a vacuum pump, and are opened and closed through a system of valves. When the vacuum pump is turned on, air pressure forces the part against the gripper plate. In order to maintain this vacuum, the holes and channels must be sealed off by contact between the surrounding chuck-workpiece surfaces. The magnitude of this force is the product of the sealed hole/channel area between the workpiece and the gripper plate and the atmospheric pressure (up to 12 psi).

Vacuum chucks are used to hold workpieces made from any material. However the bottom surface of the workpiece must be smooth. Furthermore holes or channels that will be exposed by the machining process must be plugged. The axial direction (or perpendicular to contact surfaces) holding strength of a vacuum chuck can not exceed atmospheric pressure (12 psi). Likewise assuming a coefficient of static friction of 0.2, which is a value typical of metal-to-metal contact, the shear direction (or parallel to contact surfaces) holding strength of a vacuum chuck is roughly 2.4 psi.

Due to their low holding strength, vacuum chucks are typically used for the light milling and drilling of small, thin thickness parts. They are also used for the high speed machining of workpieces that have very large, smooth contact surfaces. In these cases, the low holding strength of the fixture is overcome by the large contact area between the fixture and workpiece. These applications are typically found in the aerospace industry.

A conventional magnetic chuck, such as models manufactured by Tecnomagnete®, is used to hold workpieces made from ferro-magnetic materials (cast iron, steel, and some nickel alloys). The chuck generates a magnetic field either through the use of a permanent magnet or electromagnet. In both cases, the magnetic force pulls the workpiece against the gripper plate.

The strength of the magnetic force acting on the workpiece is a direct function of the strength of the magnetic field and the proximity of the workpiece material relative to the gripper plate. The former is heavily influenced by the ferromagnetic properties of the workpiece material and the strength of the magnets. In general the stronger the field and/or the closer the material, the stronger the magnetic force. It is also known that for electromagnetic chucks, a decrease in the workpiece-gripper plate contact area or increased surface roughness of the contacting workpiece surface leads to a significant decrease in magnetic force.

Magnetic chucks are capable of exerting significantly larger clamping forces than vacuum chucks axial direction holding strengths as high as 205 psi (for low carbon steel) and shear direction holding strengths of 40.2 psi (assuming a coefficient of friction of 0.2). Consequently, magnetic chucks are used in applications involving higher material removal rates. They are mostly for grinding applications. However they are also used for machining center operations as well. Furthermore if desired, parallels can placed on top of the gripper plate in order to locate the bottom surface of the workpiece. Since this displaces the workpiece material away from the gripper plate and reduces the contact area, it also decreases the magnetic force acting on the workpiece. Workpieces held by magnetic chucks are often left with residual magnetism. This residual magnetism is eliminated or reduced with separate demagnetizing equipment.

A conventional electro-static chuck is used to hold electrically conductive materials. The gripper plate is an electrode coated with a nonconductive material such as a plastic resin. The workpiece and gripper plate are connected to a voltage source, which causes positive electric charge to be deposited on the workpiece and negative electric charge to be deposited on the gripper plate (or vise-versa). In turn this results in an electrostatic force that pushes the workpiece against the gripper plate.

In general, the electro-static force that is generated is quite small, usually less than 20 psi per workpiece-gripper plate contact area. Because of this weak clamping force, electro-static fixtures are rarely used for machining applications.

However they are used extensively by the semi-conductor industry for holding semi-conductor materials for a variety of other processes.

All three technologies offer the following advantages. Greater access to the workpiece, thus permitting more surfaces to be processed in a single set up and/or a greater number of workpieces to be held in a single set up. Evenly distributed, small contact stresses between the bottom of the workpiece and the gripper plate, thus minimizing part degradation due to pre-load deformation, plastic indentation, and scratching. Instantaneous activation and deactivation of clamping forces. However because of their technical limitations, these technologies are not used for the majority of machining center applications.

Adhesive bonding is used to hold flexible and/or geometrically complex parts that cannot be mechanically clamped nor held effectively in either a vacuum chuck or magnetic chuck or electro-static chuck. In general this technique is typically restricted to the manufacture of a very small number of parts. This is due to the long lead time necessary to form an adhesive bond and to destroy (or structurally weaken) the bond once machining has been completed.

Some commercially available adhesive systems (for example those manufactured by MCP Group) utilize a low melting temperature, bonding material to either adhere the workpiece to a sub plate and/or encapsulate it. These bonding materials are either metal, polymer, or water. These metals are an alloy of bismuth, zinc, and tin. The melting points of these metals range from 75° C. to 250° C. are dependent upon their composition.

One embodiment to use these materials for simple bonding to a sub plate includes a pool mounted on to the top surface of the sub plate, and the workpiece is placed in the pool. A small gap between the bottom surface of the workpiece and the sub plate may be enforced via shim stock or through some other mechanical means. The low melt metal is heated to a liquid state, and subsequently poured into the pool to a level just above the workpiece-sub plate gap. The metal is allowed to cool and harden. The metal acts as an adhesive to bond the workpiece to the sub-plate. In addition, hardened metal surrounding the edges of the workpiece create a mechanical barrier to resist workpiece motion (i.e. partial encapsulation). At this time, the subplate is mounted to the machine tool and the exposed surfaces of the workpiece are machined. Upon completion, the workpiece is removed by either melting the bonding metal via a torch or placing the sub-plate and workpiece into an oven.

Another complete or partial encapsulation of the workpiece includes a mold. The walls of the mold are in the form of easy to grip surfaces such as parallel planar surfaces or a cylindrical surface. Molten metal, as described above, is subsequently poured into the mold and allowed to encapsulate the workpiece including its internal cavities. The encapsulated workpiece is removed from the mold and mounted into either a vise or chuck. Dismounting of the workpiece is carried out as described above.

A thermoplastic equivalent of this material is commercially available, for example Rigidax™ manufactured by M. Argüeso & Co. Inc. Various formulations of thermoplastic have melting points that range between 65° C. to 100° C. Both low melt metals and thermoplastic have been successfully used in a number of machining applications. However their use has limitations, such as thermal distortion of thin walled workpieces during solidification and mechanical distortion due to significant shrinkage of the molten substance. In addition, both have very low bonding strength with aluminum (0.246 psi for low melt metal, 9.98 psi for thermoplastic).

Another embodiment uses a system of coolant coils and heating elements to solidify a coolant by lowering the temperature of coolant below the freezing point of the coolant, similar to an ice rink. One such device is the Ice Vise™, manufactured by Horst-Witte. The device includes features very similar to a magnetic chuck with the exception that it has a very small retaining wall. It is designed to mount directly to a machine tool table. Beneath the chuck contact surface runs a system of coolant coils and heating elements.

To use the frozen vise, a thin film of water deposited on to the chuck contact surface. The workpiece is placed in contact with this surface. Coolant is subsequently driven through the coils, which causes the water film to freeze and bond the workpiece to the contact surface. The frozen vise control system continues to drive coolant through the coils in order to maintain the ice temperature around −10° C. ±2° C. The time required to freeze the film is reported to be around 90 seconds.

After machining, the heating elements are activated to melt the ice film and release the workpiece. The time required to do this is reported to be around 90 seconds. Variants of this device include those that use an integrated vacuum chuck to hold the workpiece during the freezing process, and a unit that uses shop air rather than traditional coolant for the cooling medium. The system will also drive warm shop air through the same coils for the purpose of melting the ice film.

Another embodiment has a significantly deeper retaining wall, which allows coolant, such as water or water-based gel, to be pooled around the outer surfaces of the workpiece. When frozen, the solidified fluid partially encapsulates the workpiece. The water-based gel can provide an even greater degree of encapsulation. In these cases, the gel is packed around the walls of workpiece and into accessible cavities. As the fixture and workpiece cool, the gel freezes into a solid block. The cycle times for the use of these embodiments is considerably longer than other alternatives due to the greater thermal masses involved. It has been shown that ice at −10° C. has an ultimate tensile strength ranging from 145 psi to 1300 psi, depending upon strain rate.

The limitations of a freezing work holding device is that it cannot be used in orientations other than the vertical. If vertical thru holes are to be drilled into the workpiece, a significant clearance must be established between the bottom of the workpiece and the chuck. This additional clearance must be filled with either water or water based gel, thus increasing the thermal mass that must be frozen, and dramatically increasing the freezing and melting cycle time. Lastly the freezing process will inevitably lead to severe temperature gradients within the workpiece, which will result in its thermal distortion. In turn this can lead to dimensional control problems. Even if the workpiece is thermally soaked to −10° C., this will still lead to significant dimensional problems or process development time to overcome them, since all finished part dimensions must be measured at 20° C.

Another work holding device uses a solid adhesive starting material such as Mitee-Grip™ manufactured by Mitee-Byte®. The solid adhesive is a heat-activated wax-based adhesive that is either embedded in paper, coated on nylon mesh, or pressed into stick form to hold very thin or hard-to-hold parts. The paper product, for example, can hold smooth, flat parts. The mesh product captures additional wax material in the web and aides in holding irregular shaped parts. The stick form material is used in shallow cavities for holding concave, convex and flimsy parts.

One example of a solid adhesive work holding device requires the bottom surface of the workpiece to be covered with the solid adhesive and pressed against a sub plate. The sub plate, adhesive, and workpiece are then positioned on a hot plate (or in an oven) and heated to a temperature above the melting point of the solid adhesive, for example between 80° C. and 90° C. At such a temperature, the solid adhesive melts and covers the workpiece and sub plate surfaces. The sub plate, adhesive, and workpiece cool to room temperature and become one unified body.

The next step in the process is to mount the sub plate to the machine tool in preparation for machining. After machining, the workpiece and sub plate are reheated using the procedure described above. Once the adhesive has melted, the workpiece is separated from the sub plate. This complex process and time consuming process is usually used for special machine jobs. It is believed that the tensile strength of the solid adhesive is approximately from 62 psi to 600 psi.

None of the adhesive bonding systems described thus far use adhesives that have strengths equivalent to those (3000 psi to 5000 psi) associated with permanent, high strength, structural adhesives. Structural adhesives are not used in part, because of their long cure times. Structural adhesives are cured by a variety of means, including exposure to moisture, addition of a chemical catalyst, and thermal activation. Each curing mechanism has a relatively short setting time (10 seconds to one minute), but their time to full cure is considerably longer (15 minutes to hours).

Another major limitation of structural adhesives is their inability to be re-melt once cured. In addition, their strength can only be diminished by elevating their temperatures to very high temperatures and/or exposure to harsh chemicals, neither which can be done easily in most cases without damage to the workpiece.

A solution to the curing and debonding problems is the use of radiation. Many structural adhesives can be cured through exposure to radiation. This radiation is typically either electromagnetic radiation or electron bombardment. Using these means, a structural adhesive can be fully cured in seconds. Likewise radiation can also be used to structurally weaken adhesive bonds to allow easy removal of the workpiece from the fixture.

In order for an adhesive fixturing system to utilize structural adhesives and radiation, it must be capable of exposing the adhesive between a fixture-workpiece joint to radiation to cure the adhesive within seconds, and radiation to thermally destroy or structurally weaken the adhesive between a fixture-workpiece joint within seconds with negligible thermal transfer to the workpiece and fixture. The thermal transfer requirement is critical, because thermal growth of the fixture-workpiece system can lead to significant manufactured feature errors.

Accordingly, it is an object of the present invention to provide a system and method to hold workpieces with minimum pre-load distortion, with maximum rigidity, and with maximum accessibility to the manufacturing process.

It is another object of the invention to provide a system and method applicable to low volume, job shop applications as well as dedicated high volume applications It is an alternative object of the invention to provide a system and method to significantly reduce the lead time and cost for part manufacture while simultaneously improve part quality.

SUMMARY OF INVENTION

The present invention includes the system and method by which workpieces are loaded to and unloaded from a manufacturing fixture using a radiation responsive adhesive as the bonding agent. The term radiation refers to electromagnetic radiation, such as light, for example, preferably in the wavelength range of 300 nm to 1064 nm, and electron beam radiation. The term radiation responsive refers to a substance's ability to physically respond (e.g. heat up) or otherwise become excited in response to exposure to radiation, such as light. The adhesive work holding system for securing a workpiece for manufacturing includes a fixture having a radiation transmittive fixing surface, and a radiant energy delivery system being capable of emitting radiant energy being adjacent to and in communication with the fixing surface of the fixture.

During the workpiece loading cycle, an adhesive dispenser deposits radiation responsive adhesive on to a load bearing, light transmittive surface, known as gripper pins. As a preparatory step, the workpiece surfaces should be cleaned of dirt and grease. The workpiece is subsequently pushed against the locators and towards the gripper pins causing the adhesive to squeeze between workpiece and gripper pins. Curing radiant energy is transmitted through the gripper pins and on to the adhesive to "cure" or solidify the adhesive and bond the workpiece to the fixture.

Debonding radiant energy is also transmitted through the gripper pins and on to the cured adhesive to destroy or structurally weaken or debond the cured adhesive. In the specification, the terms debond and variations thereof are used interchangebly with the terms destruction of or structurally weakening of an adhesive joint or bond and variations thereof. The bond and debond operations only take a few seconds each and are extremely cost effective. All mating surfaces should be cleaned after the debonding process to remove residual adhesive substrate.

DETAILED DESCRIPTION OF THE INVENTION

The disclosure invention can be configured for any manufacturing operation requiring the holding of a workpiece. The embodiments contained herein are directed to high volume machining for illustration purposes, but are not limited to such manufacturing applications.

Figure 1:
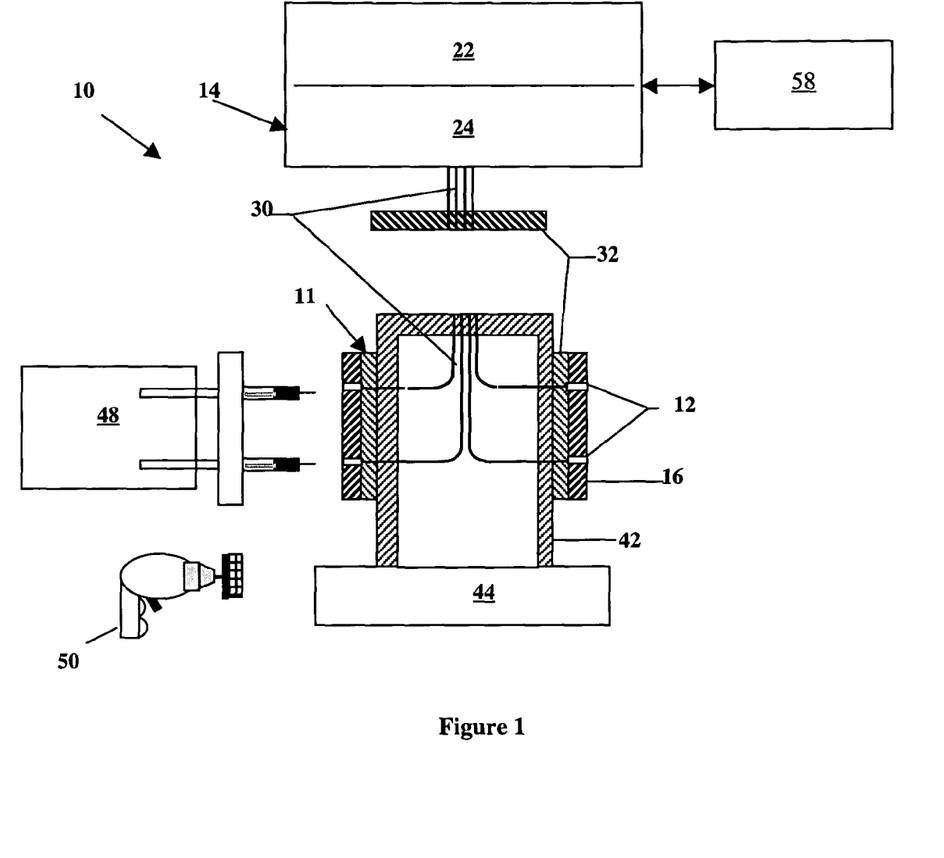
FIG. 1 is schematic of various components of the present invention together with a section view of the radiant energy transmission system.
Figure 2:
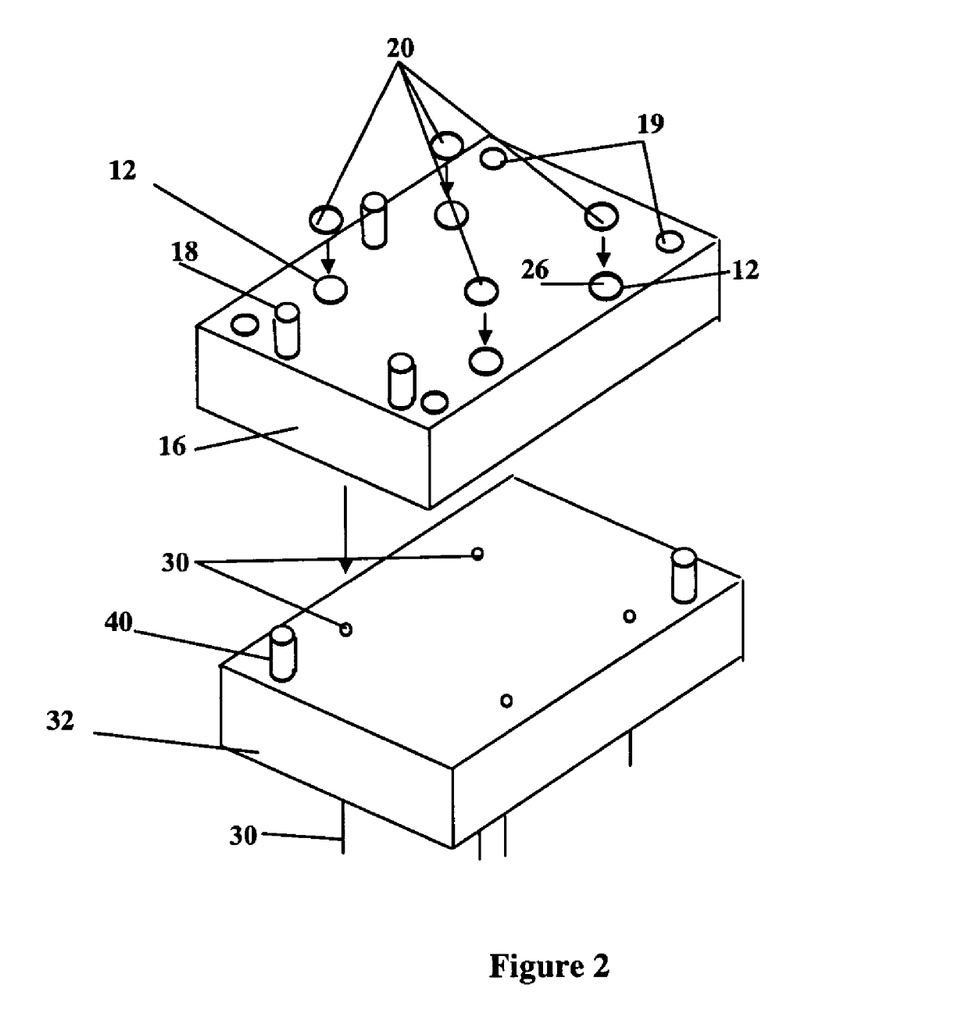
FIG. 2 is an exploded pictorial view of the radiant energy transmission system of the present invention of FIG. 1.

The present invention 10 illustrated in FIGS. 1 and 2 include gripper pins 12, radiant energy transmission system 14, gripper pin chassis 16, and removable/retractable locator pins 18 and locator pads 19. Also shown are radiant energy source 22, optical routing system 24, light guides 30 and light guide chassis 32, which are components of radiant energy transmission system 14. A computer control system 58 controls the emission of radiant energy from the radiant energy transmission system 14 to the gripper pins 12. Radiation responsive adhesive 20 is applied to a contract surface 26 of the gripper pins 12 for bonding the workpiece 28 to the gripper pins 12. Gripper pin chassis 16 and light guide chassis 32 are mounted onto to a tombstone 42 to form a fixture 11.

High volume machining applications are often carried out on, for example, a four axis, horizontal machining center, with pallet swap capability. In this case, the fixture 11 is mounted to one of the two rotary tables of the machine tool (not shown). Workpiece unloading and loading would take place outside of the machining center while it is processing parts mounted on a similar tombstone-fixture system. The geometric variability of the workpiece surfaces is relatively small. This would be the case if they were originated by processes such as rolling, extrusion, machining, powder processes, or die-casting.

Figure 12:
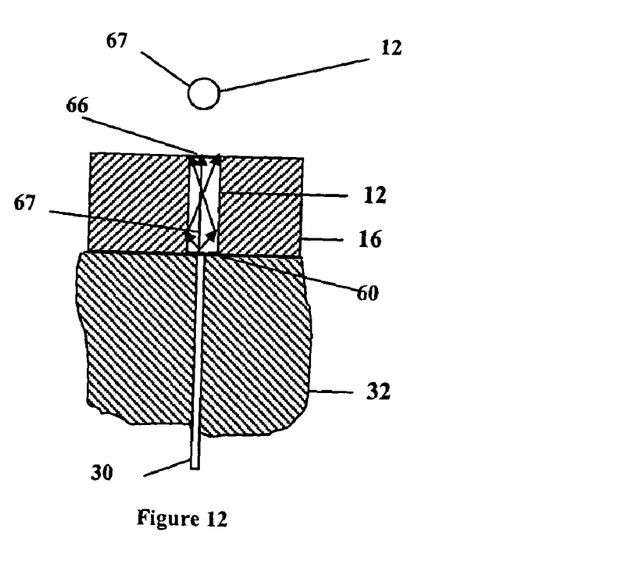
FIG. 12 is a partial cross-sectional view of radiant energy transmission system and gripper pin of the present invention of FIG. 1 illustrating a stationary light beam embodiment, along with a top view of the gripper pin showing a light beam filling the entire diameter of the gripper pin.

The gripper pins 12 are load bearing optical elements that transmit radiant energy, for example light, to the radiation responsive adhesive 20. Depending upon the application, gripper pin 12 can vary in size and shape, and can be used as a wave guide, lens, or simple window. A wave guide is presented for the purposes of illustration (FIG. 12). One embodiment of the gripper pin 12 has a shape of a right-ended cylinder, preferably having all surfaces ground and polished. A stationary light beam 67 emanating from the light guide 30 is uniform and divergent. The light beam 67 enters the entry surface 60 of the gripper pin 12, and either passes directly through to the gripper pin-adhesive interface 66 or indirectly after bouncing off of the cylindrical surface of the gripper pin 12. However, the gripper pin 12 could take on a variety of other shapes and still function as a wave guide.

The gripper pins 12 are preferably made of a material that is very strong, hard, and stiff, and has radiation transmittive properties in the UVA to near infrared wavelengths. The term radiation transmittive properties refer to a material's ability to optically transmit light or radiant energy. The gripper pin 12 is manufactured from random orientation, TiO2 free, sapphire. Sapphire is the preferred substance for this application due to its high stiffness, high strength, high hardness, and ability to transmit light in the UVA to near infrared wavelengths. Also sapphire has a high index of refraction ($\approx 1.76$). However, other suitable materials include diamond, single crystal silicon dioxide, ruby, cubic zirconia, and zirconium oxide.

Figure 3:
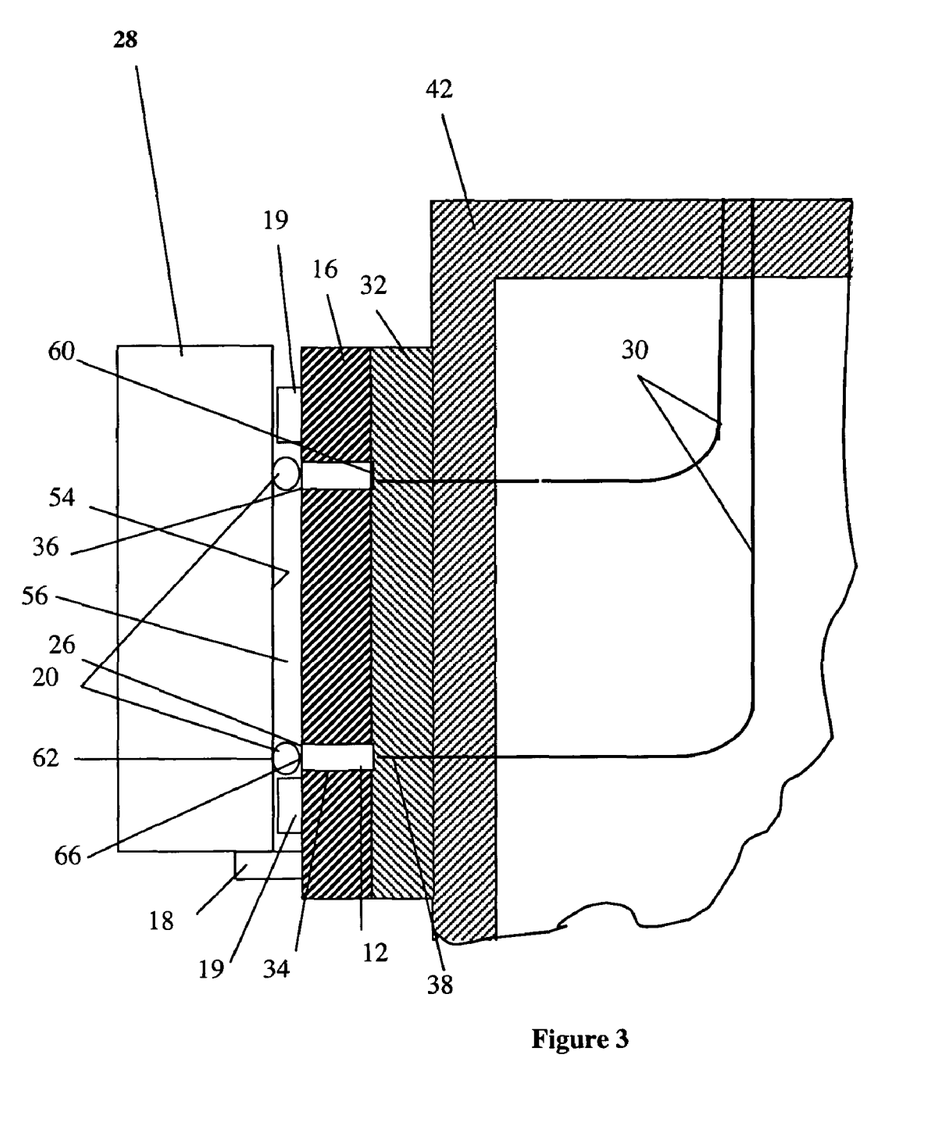
FIG. 3 is a partial cross-sectional view of radiant energy transmission system and gripper pins of the present invention of FIG. 1 illustrated with a workpiece attached.

The gripper pin chassis 16 is the structural matrix that holds the gripper pins 12. One embodiment of the fixture 11 includes a set of gripper pin chassis 16, each designed to conform to an underside surface of the workpiece 28, shown in FIG. 3. The number and spatial arrangement of the gripper pin chassis 16 is application specific, along with the number and spatial arrangement of the gripper pins 12 contained therein.

The gripper pins 12 are embedded in a gripper pin chassis 16 (FIG. 3) of the chassis 16 using an adhesive to secure the gripper pins 12 within the bores 34. Any adhesive is suitable, however, a radiation responsive adhesive with an index of refraction lower than the gripper pin material is preferred. The use of such adhesive allows for the rapid assembly of the gripper pins 12 into the gripper chassis 16. The gripper pins 12 are coated with the adhesive, inserted into the bores 34, exposed to, for example, UV-visible light (broad band spectrum) from a curing lamp, and then, preferably, post-cured in an oven for approximately fifteen minutes around 150° C.

The radiation responsive adhesive 20 has the strength and durability necessary to hold the gripper pins 12 in place over its expected life. The radiation responsive adhesive 20 is optically clear having an index of refraction of approximately 1.5. Because the index of refraction of the gripper pin 12 is substantially higher than the radiation responsive adhesive 20, light passing through the gripper pin 12 and striking its sides will be subject to near perfect internal reflection. Thereby increasing the transmission efficiency of the gripper pin 12.

The gripper pin chassis 16 incorporate locator pins 18 and locator pads 19 for positioning the workpiece relative to the gripper pins 12 and to the machining datum reference frame, and to position the workpiece relative to all of the gripper pins 12 on the fixture 11. The locator pins 18 and locator pads 19 are assembled and/or extended right after the deposition of the radiation responsive adhesive 20 and before the mounting of the workpiece 28. The locators 18, 19 are not load bearing. Consequently, once the workpiece 28 has been bonded to the fixture 11, locators 18, 19 may be disengaged either by removal or retraction or other means in order to provide greater access of the manufacturing tool to the workpiece 28. Additionally, the locator pads 19 define the gap 56 between the workpiece 28 and gripper pin chassis 16.

In the preferred embodiment, the gripper pin chassis 16 is fixed relative to the fixture sub-plate or tombstone 42 since the adherent workpiece surface 54 is subject to minimal form error. However, in cases in which the workpiece adherent surface 54 is subject to significant form errors, as would be expected if it were originated by a process such as sand casting, an alternative embodiment (not shown) allows relative motion between the gripper pin chassis 16 and the fixture sub-plate or tombstone 42. Such an alternative embodiment prevents unintentional contact with the workpiece 28 while the workpiece 28 is being pushed against the locator pins 18 and locator pads 19. The alternative embodiment is also used to minimize the gap 56 between the workpiece 28 and gripper pins 12. In such cases, it would be expected that the gripper pin chassis 16 be actuated and moved relative to the workpiece surface in a fashion similar to an adjustable, mechanical support.

The light guides 30 are the optical conduits through which radiant energy, such as light, is delivered to the gripper pins 12. Each light guide 30 is fixed in position relative to the gripper pin 12. Radiant energy emanating from the light guide 30, is defocused and exits at a predetermined angle. The radiant energy enters the gripper pin 12 and transmits either directly to the gripper pin-adhesive interface 66 or does so after internal reflection. Regardless, the entire gripper pin-adhesive interface 66 is illuminated with substantially uniform irradiance. The magnitude of the irradiance will be proportional to the power of the transmitted radiant energy and inversely proportional to the cross section area of the gripper pin exit surface 36.

One embodiment of the light guide 30 is a commercially available fiber optic cable, adaptable for use with radiant energy sources such as Excimer and YAG laser. Such as light guides manufactured by Ceramoptec. Another embodiment of a light guide is manufactured by Lumatech.

The light guide chassis 32 is the structural matrix for the light guides 30. In a fashion similar to the gripper pins 12, the light guides 30 are adhered to the bores 38 of the chassis 32 using a radiation responsive adhesive 20 such as Dymax® 602. However, any suitable adhesive is acceptable.

The gripper pin chassis 16 and light guide chassis 32 are connected, preferably bolted together and their alignment is controlled through dowel pins 40 (see FIG. 2). Two chassis are preferably used rather than one in order to facilitate assembly and disassembly of the fixture 11, and to minimize the time, effort, and expense needed to repair gripper pins 12 that are damaged in service. The light guide chassis 32 is connected directly to the tombstone 42 (FIG. 1), which is attached to the tombstone base 44.

An alternative embodiment (FIG. 13) utilizes the optical function of the gripper pin 12 as a window replacing the stationary light guide described above with either a moving light guide or moving direct transmission light beam.

Figure 13:
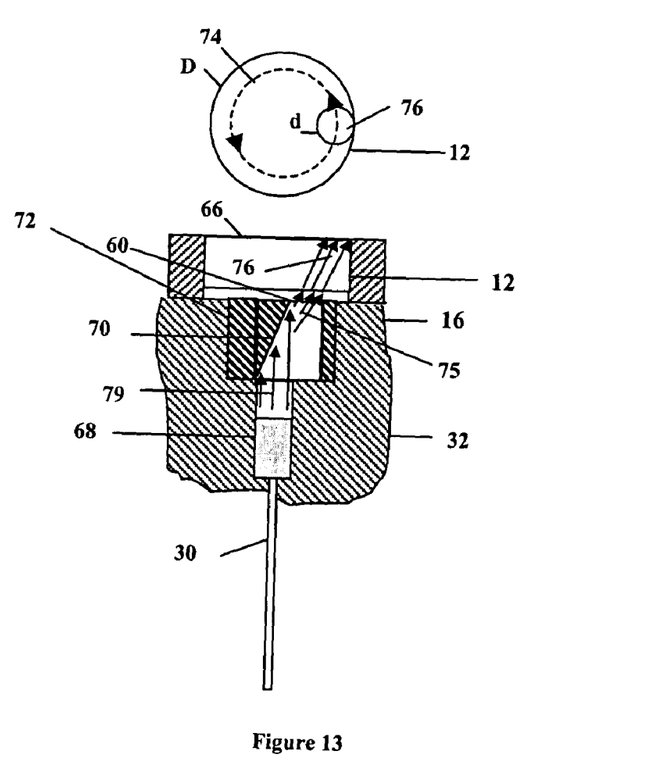
FIG. 13 is a partial cross-sectional view of an alternative embodiment of the radiant energy transmission system and gripper pin illustrating a moving light beam embodiment, along with a top view of the gripper pin showing a light beam filling only a portion of the diameter of the gripper pin.

In this embodiment, the gripper pin 12 acts as a load bearing window. A moving light beam 76 enters the gripper pin exit surface 36. The light beam 76 has a fixed diameter d smaller than the gripper pin diameter D and moves along a circular path 74. Therefore, the light transmitted through the gripper pin 12 will not illuminate the entire gripper pin exit surface 36, but only a portion thereof. The light 75 entering the gripper pin entry surface 60 is also beam of fixed diameter and moves along a circular path. The moving light beams are generated by passing divergent light 77 through a stationary light guide 30 into a collimating lens 68, which focuses the light into a beam of fixed diameter d. Collimated light beam 79 is reflected off of a planar mirror 70, which is rotating about the axis of the gripper pin 12. The planar mirror 70 is fixed to a rotating mechanical device 72 housed within the light guide chassis 32. The rotating mechanical device 72 is actuated by conventional means including electrical, pneumatic, or hydraulic.

Alternatively, the diameter d of the light beam 75 entering and light beam 76 exiting the gripper pin 12 is expanded or contracted by adding a focusing lens (not shown) located between the collimating lens and the gripper pin.

Another alternative embodiment (not shown) supplies the curing light and debonding light to the gripper pins via direct beam transmission from the respective radiation energy sources, thus eliminating the need for light guides and light guide chassis. The entry surfaces of the gripper pins are exposed to the direct light beams with means for moving the beam from one gripper pin to the next gripper pin. Means for moving the beam utilizes an optical system of elements as lenses, stationary mirrors, actuated mirrors, and/or actuated axes instead of light guides. In such cases, a clear passageway in the backside of the fixture sub-plate or tombstone should exist.

As discussed above, the radiation responsive adhesive 20 is a light curable structural adhesive, such as Dymax® 602. The commercially available adhesives 20 will polymerize when exposed to radiant energy ranging in wavelength from 300 nm to 550 nm. The radiation responsive adhesive 20 may be unaltered (or pure) or mixed with a colorant such as a pigment, dye, or other chemical additive for the purpose of enhancing its ability to absorb debonding light (to be discussed in detail below), thereby fine tuning the absorption spectrum of these adhesives to specific wavelengths within the bonding and debonding range.

Light absorption is necessary since light must fully penetrate an adhesive joint in order to cure adhesive at the far adhesive-workpiece interface 62. Curing light penetrating the adhesive is subject to Beer-Lambert's law of light absorption. Consequently, the irradiance of the transported beam decreases exponentially with penetration depth. The rate of decay is dictated by the absorption coefficient associated with the adhesive. Since the pure adhesive is optically clear, the absorption coefficient for all wavelengths by necessity will be extremely low.

Radiation responsive adhesives contain photo-initiators. When exposed to electromagnetic radiation within a certain wavelength band, the photo initiators become free radicals. The minimum exposure necessary to initiate cross polymerization is extremely low in the order of 10 mJ/cm2. The cross polymerization process continues until there are no more photo-initiators available for radicalization. The degree of polymerization is exponentially related to the exposure (J/cm2). The rate of polymerization is controlled largely by the irradiance (W/cm2) of the curing light. The higher the irradiance, the larger the exposure, and hence the faster the cure. Radiation responsive adhesives cure in 5 seconds or less upon exposure to light in the ultra-violet and blue spectrum (wavelengths ranging from 300 nm to 550 nm) or to high speed electrons (see Tables 1 and 2 below).

Acrylic-based radiation responsive adhesives are widely used in the assembly of a large variety of electro-mechanical products manufactured by, for example, Loctite and Dymax. Acrylic-based adhesives contain photo-initiators in varying formulation and quantity. As stated above, photo-initiators will form free radicals when exposed to light within a wavelength range of 300 nm to 550 nm, which in turn initiate and propagate the cross polymerization of the adhesive. Adhesives that are cured by electron beam transmission do not require additives for radicalization. Instead the monomers within the adhesive are directly radicalized through interactions with the penetrating high speed electrons. These adhesives have low toxicity and do not emit volatile organic compounds. They also have a shelf life typically greater than one year.

Since these adhesives are optically clear in both the uncured and cured state they absorb little radiation in the UVA and visible spectrum, including light within the range of 300 nm to 550 nm. Once cured, the ability of the adhesive to absorb light within this narrow range diminishes even further. As discussed above, coloration including pigment, dye, or other some other chemical may be added to the adhesive in order to increase its absorption of debonding light (discussed further below).

The ideal additive transmits light within the absorption band of the photo-initiators of the adhesive (preferably 300 nm to 550 nm) and readily absorb debonding light outside of this spectrum (preferably between 600 nm and 1064 nm). The use of the additive does not hinder the curing process, and the cost of delivering debonding light at the prescribed wavelengths is relatively cheap.

Examples of such additives are the dyes manufactured by Gentex used in laser safety goggles and enclosure panels. These plastic goggles-panels are designed to transmit specific bands of wavelengths in the visible spectrum and to absorb wavelengths within bands around those of common lasers (excimer, Nd:YAG, etc.). Since photo-curing adhesives are polymers, it is expected that adding such a dye will improve the light absorbency of the adhesive.

One embodiment of a blended or mixed radiation responsive adhesive 20 has, for example, a weight ratio of 99.5 percent pure adhesive (such as Dymax® 602) and 0.5 percent colorant (such as carbon black). However, any radiation responsive adhesive blend ranging from 90% to 99.9% of substantially clear radiant responsive structural adhesive having an index of refraction of approximately 1.5 and 0.1% to 10% of colorant sufficient to cure or destroy an adhesive joint is suitable and within the scope of the invention.

Carbon black pigmentation, such as Raven 790 manufactured by the Columbian Chemical Co., couples well with laser light in the near infrared, and only requires a small concentrations, without degrading the strength of a fully cured adhesive joint. The pigment readily absorbs light within the curing wavelength spectrum and interferes with the transmittance of curing light through the joint.

During the curing process, the portion of adhesive that receives the smallest quantity of exposure will be the least cured, and hence the weakest in strength. The least cured region will typically be the one closest to the adhesive-workpiece interface 62. Since the strength of the entire joint is limited by the strength of its weakest region, the strength of an adhesive will always be limited by the total exposure at the adhesive-workpiece interface 62. Therefore higher curing light irradiance results in faster and deeper cures.

The light exposure necessary to initiate the cure of a radiation responsive adhesive 20 is very low, on the order of 10 mJ/cm2. The light irradiance necessary to quickly cure a 0.003" adhesive joint is relatively low is on the order of 1 W/cm2 or less for pure adhesive and 8 W/cm2 or less for a pigmented adhesive joint of the same thickness (see Tables 1 and 2 below for further details).

At room temperature the strength of a fully cured adhesive joint is quite high. For example, the joint between a gripper pin 12 and a workpiece 28 having a smooth metallic surface typically has an ultimate tensile strength greater than 6000 psi. However, the strength of a cured adhesive joint is permanently diminished if its temperature is raised significantly above its specified service temperature for example (300° F./150° C.) for a finite duration of time resulting in the charring of the radiation responsive adhesive 20 and the destruction of chemical bonds of radiation responsive adhesive 20.

With regards to debonding, an adhesive joint bonded by a structural adhesive is destroyed (or structurally weakened) either thermally, chemically or mechanically (i.e. pulling the joint apart). For instance, a typical acrylic-based adhesive joint is destroyed when the joint temperature is elevated above 300° F./150° C. Further, the adhesive joint is destroyed through exposure to a chemical such as a paint stripper, though much more slowly than thermal degradation.

The debonding or structural weakening of an adhesive joint is accomplished by transmitting laser beam approximately between 600 nm and 1064 nm through the pure adhesive onto the workpiece surface, thus raising the temperature of the adhesive-workpiece interface above the service temperature for some short predetermined duration of time. Because the time duration is very short, heat transfer to the workpiece bulk will be negligible.

As discussed above, an adhesive with an additive that is a good absorber of the debonding light compared to pure adhesive. The additive will improve the absorbency of radiation by the adhesive joint and the conversion into heat, and less heat transferred to the workpiece. The additive will heat up rapidly and subsequently transfer this heat to the surrounding adhesive via conduction. The present invention transmits light through, for example, a colored adhesive or pigmented layer of adhesive, causing the pigment to absorb the light, heat up beyond the adhesive service temperature, and destroy the surrounding adhesive bond along the surface of the workpiece. The use of an adhesive with an additive is substantially more efficient than an adhesive without additive in terms of required radiant energy to debond with the average light irradiance to debond being approximately 1000 W/cm2.

From experimental observations (Tables 1 and 2 below), the following is known with regard to the effects of carbon black percentage on the curing process and debonding process for constant curing light irradiance and constant debonding light irradiance:

1. The greater the carbon black percentage, the greater the parasitic absorption of curing light, the smaller the maximum cure depth of the adhesive joint, and the longer the required cure time to achieve full joint strength; and 2. The greater the carbon black percentage, the greater the absorption of debonding light and the smaller the required time to debond the adhesive joint.

Further, if carbon black percentage is held constant along with the irradiance of the curing light and debonding light, then the following is true with regard to adhesive joint thickness:

1. The adhesive joints with thicknesses larger than the maximum cure depth will have no strength at the adhesive-workpiece interface, and hence no bonding strength for joints with thicknesses below the maximum cure depth;

2. The larger the adhesive joint thickness, the longer the time to reach full cure for joints with thicknesses below the maximum cure depth, the larger the adhesive joint thickness, the greater the ability of the joint to absorb debonding light, and the shorter the time required to debond the cured adhesive joint; and 3. The greater curing light irradiance and greater debonding light irradiance will lead to greater maximum cure depths, shorter curing times, and short debonding times.

The table 1 below summarizes the cured joint strength associated with various adhesive and curing process variables.

| Carbon Black Percentage | Joint Thickness (in.) | Curing Light Irradiance (W/cm2) | Cure Time (s) | Ultimate Adhesive Joint Strength (psi) |
| --- | --- | --- | --- | --- |
| 0 | .003 | 1.35 | 20 | 7195 |
| 0 | .005 | 1.35 | 20 | 7011 |
| .5 | .002 | 1.35 | 60 | 7080 |
| .5 | .003 | 1.35 | 5 | 3379 |
| .5 | .003 | 1.35 | 20 | 5023 |
| .5 | .003 | 1.35 | 30 | 5611 |
| .5 | .003 | 1.35 | 60 | 6821 |
| 1 | .000 | 1.35 | 20 | 7215 |
| 1 | .001 | 1.35 | 20 | 5848 |
| 1 | .002 | 1.35 | 20 | 420 |
| 1 | .003 | 1.35 | 20 | 0 |
| 0 | .003 | 7.85 | 10 | 7143 |
| 0 | .005 | 7.85 | 20 | 8277 |
| .5 | .003 | 7.85 | 5 | 6245 |
| .5 | .003 | 7.85 | 10 | 7093 |
| .5 | .005 | 7.85 | 10 | 5860 |
| .5 | .005 | 7.85 | 20 | 5952 |
| 1 | .003 | 7.85 | 30 | 0 |

The table 2 below summarizes the residual debonded joint strength associated with various adhesive and debonding process variables.

| Carbon Black Percentage | Joint Thickness (in.) | Debonding Light Average Irradiance (W/cm$^2$) | Debonding Time (s) | Residual Ultimate Adhesive Joint Strength (psi) |
|---|---|---|---|---|
| 0 | .003 | 1270 | .2 | 6884 |
| .2 | .001 | 1270 | .2 | 7045 |
| .2 | .003 | 1270 | .2 | 5670 |
| .5 | .001 | 1270 | .2 | 1034 |
| .5 | .003 | 1270 | .2 | 363 |

Referring again to FIG. 1, the radiant energy transmission system 14 includes radiant energy source 22 and an optical routing system 24. A radiant energy source 22 produces light or radiant energy for either curing or debonding the radiation responsive adhesive 20, or possibly both. Radiant energy for curing is produced by a broad band wavelength curing lamp (short arc, mercury vapor). A laser with a wavelength within the absorption band of the adhesive (excimer with a XeF gax mixture (351 nm), double Nd:YAG (532 nm) produces radiant energy for curing an adhesive and destroying an adhesive bond, and forming a residual adhesive substrate 52 on the workpiece and gripper pin exit surface 36. A laser is preferred to produce the higher required irradiance radiant energy requires destroying the radiation responsive adhesive 20. A laser is used for curing the adhesive as well as destroying the adhesive, preferably using a pulsed double or triple Nd:YAG (355 nm).

Regarding radiant energy source 22, one light source used to cure these adhesives is a UV-Visible light curing lamp. UV-Visible light lamps employ a metal halide bulb or electrode-less fusion bulb that emits a broad range of wavelengths in the UVA and visible spectrum. However, most of the radiant energy is centered between 300 nm and 550 nm. Within this spectrum, peak transmission occurs at a few wavelengths. Through chemical adjustment of the photo initiators, the absorption spectra of the adhesive is made to closely match these peaks.

The UV-Visible light curing lamp provides the light for simultaneously curing the radiation responsive adhesive 20. For example, a Dymax Blue Wave, 200 Watt curing lamp is capable of transmitting light (320 nm–450 nm) at an average irradiance of 10 W/cm2 through a 5 mm core diameter light guide.

The use of a laser offers advantages over a curing lamp. Because the light emitted from a laser is coherent, the light is focused to a much smaller spot size, thus significantly increasing the irradiance of the curing light. In turn this could be used to enact greater cure depths and/or smaller curing cycle times facilitates the curing of adhesives that contain curing light interfering additives.

Likewise coherent light is transmitted with a much smaller wave guide than incoherent light of equal intensity. Additionally, the absorption band of the adhesive can be tuned to the wavelength of the laser through chemical manipulation of the photo-initiators by the adhesive supplier. In this way, the efficiency of the curing process is optimized.

A commercially available pulsed, Nd:YAG laser (1064 nm) provides the light for destroying the adhesive because its light is transmitted by fiber optic light guides at high irradiance. Pulsed light is used because of the low power and energy required to destroy a single cured adhesive. The required power of such a laser is dependent upon a number of factors.

An alternative laser embodiment is a laser appropriate for debonding the radiation responsive adhesive 20 that emits radiant energy sufficient to destroy the adhesive joint 64 in a fraction of a second with negligible heat transfer to either the workpiece 28 or gripper pin chassis 16. Destruction of the adhesive joint results from thermal degradation of the adhesive joint 64.

In one embodiment, radiant energy is routed from the radiant energy source 22 to the light guides 30 via an optical router 46. Radiant energy transferred by optical router 46 is transmitted by the light guides 30 to a light guide chassis 32. The light guide 30 is connectable with a gripper pin chassis 16 to the tombstone 42 to complete an optical network between the radiant energy source 22 and the gripper pins 12.

The optical routing system 24 includes a network of optical channels which can be any one or combinations of open channels, mirrors, lenses, light guides such as fiber optic light guides or liquid light guides and beam guidance devices. A computer control system 58 is interfaced with the network of optical channels and radiant energy emission to control the routing and level of radiant energy from the radiant energy source 22 to the gripper pins 12. Light shields or such can be added to protect operators in the general area.

After manufacturing, the workpiece 28 is debonded from the fixture 11 by exposure to a higher radiant energy level than curing. For example, laser light is transmitted through the gripper pins 12 and on to the adhesive joints 64. The adhesive joint 64 is thermally degraded within a fraction of a second with negligible heat transfer to the gripper pins 12, gripper pin chassis 16 or workpiece 28. The debonding process does not damage the gripper pins 12, gripper pin chassis 16, or workpiece 28.

After the debonding process, the workpiece 28 is removed from the fixture 11. The laser (an example of a radiant energy source 22), for example, may leave behind thermally degraded or residual adhesive substrate 52 on the surfaces of the workpiece adherent surface 54 and gripper pins 12. The degraded or residual adhesive substrate 52 should be removed from the gripper pins 12 before new radiation responsive adhesive 20 is dispensed without damage to the gripper pins 12. Thermally degraded or residual adhesive substrate is removed from the gripper pin contact surfaces through manually scrubbing with a metal scour pad or automated scrubbing with a power sander and scour pad attachment 50 or equivalent requiring three to thirty seconds. Manual scrubbing with a coarse, steel/copper scouring pad is the preferred method to remove such degraded or residual adhesive substrate 52. However, the scour pad attachment pneumatically combined with a driven power sander 50 reduces the scrubbing time and minimizes human effort. The cleaning process in either case does not damage the gripper pins 12 or gripper pin chassis 16.

Figure 10:
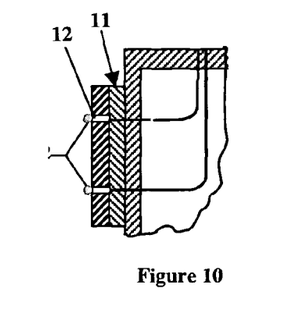

If required, a similar scouring process is applied to the workpiece adherent surface 54 to remove residual adhesive substrate 52 (FIG. 10).

Alternatively, degraded or residual adhesive substrate 52 may be removed from the workpiece using a part wash system in combination with a chemical such as toluene or other powerful solvents such as acetone or a chemical paint stripper soaked on a fine steel wool. Workpieces could be cleaned in bulk using a conventional part wash system that utilizes such solvents described above.

Returning to FIG. 1, additional components of the present invention 10 includes an adhesive dispenser 48 (commercially available) and a pneumatic sander with scour pad attachment 50 (commercially available).

Figure 11:
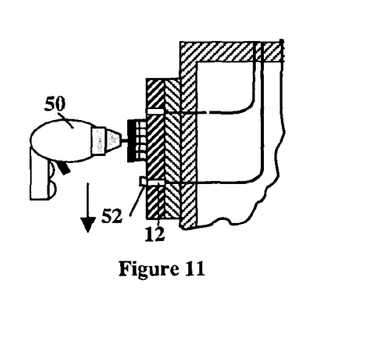

The adhesive dispenser 48 is capable of automatically dispense the radiation responsive adhesive 20 to the gripper pins 12. The adhesive dispenser 48 is an external dispenser (as illustrated in FIG. 11) or an internal dispenser (not shown). The external dispenser 48 is distinct from the gripper pin chassis 16 and is manipulated manually or through automation, such as a dispensing syringe. An internal dispenser is integral with the gripper pin chassis 16 having dispensing nozzles (not shown) near the gripper pins 12. Radiation responsive adhesive 20 would be pumped through these nozzles on to the gripper pins 12 via a system of channels (not shown) within the gripper pin chassis 16. Radiation responsive adhesive 20 is supplied to the gripper pin chassis 16 from an external reservoir pump (not shown).

Figure 4:
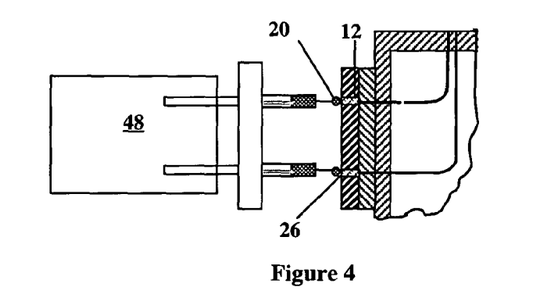
FIGS. 4–11 are process diagrams illustrating the method to use the present invention of FIG. 1.

Reference is now made to FIGS. 4–11 which illustrate the process to bond an debond workpieces to a fixture of the present invention:

Step 1: The adhesive dispenser 48 dispenses a drop of radiation responsive adhesive 20 to the contact surface 26 of each gripper pin 12 (FIG. 4).

Figure 5:
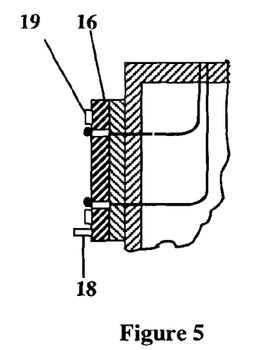
Figure 6:
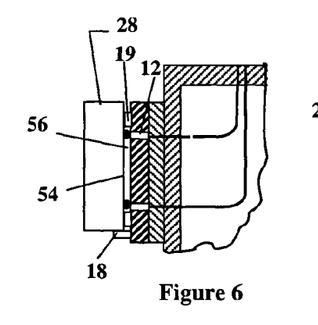

Step 2: The locator pins 18 and locator pads 19 are extended and/or assembled on the gripper pin chassis 16 (FIG. 5).

Step 3: The workpiece 28 is mounted against the locator pins 18 and locator pads 19 (FIG. 6), thereby locating the workpiece 28 relative to the machine tool reference frame. The radiation responsive adhesive 20 at each gripper pin 12 spreads between a workpiece 28 and the gripper pin 12. Depending upon the geometric variability of the workpiece adherent surface 54, the nominal gap 56 between each gripper pin 12 and workpiece 28 is approximately 0.003". The radiation responsive adhesive 20 fills all gaps between the workpiece 28 and gripper pin 12 without resulting in any significant force acting on the workpiece 28.

Figure 7:
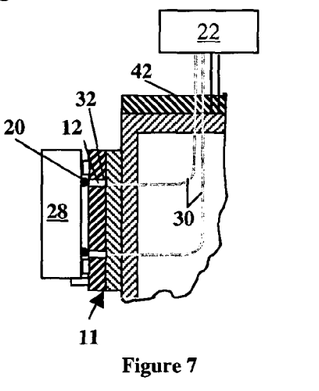

Step 4: The light guide chassis 32 connected to the radiant energy source 22, via light guides 30, is attached to the tombstone 42 (FIG. 7). However, other attachment configurations (not shown) of the radiant energy source 22 to the tombstone 42 or other fixture is suitable and within the scope of the invention. Subsequently the radiant energy source 22 simultaneously transmits curing light in the form of radiant energy (approximately 300 nm to 550 nm) to all gripper pins 12 for an approximate time duration of approximately 3 to 10 seconds. At the end of this transmission, all adhesive drops 20 are sufficiently cured or solidified to form an adhesive joint bonding the workpiece 28 and the fixture 11 providing a tensile yield strength of 6000 psi or greater.

Figure 8:
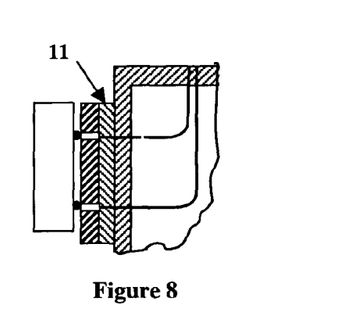

Step 5: The locator pins 18 and locator pads 19 are, if desired, retracted and/or removed from the gripper pin chassis 16 (FIG. 8). Subsequently, the fixture 11 is sent to the machining center for parts machining.

Figure 9:
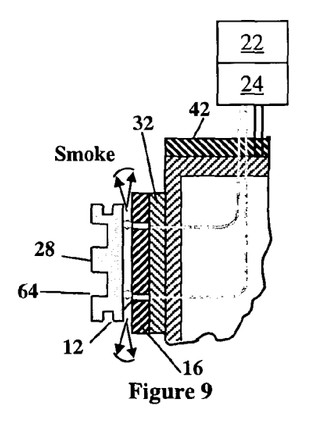

Step 6: After manufacturing, the fixture 11 undergoes a debonding procedure to separate the workpiece 28 from the fixture 11. The light guide chassis 32 connected to the radiant energy source 22 connected, for example, to the top of the tombstone 42 (FIG. 9). The optical routing system 24 transmits a pulse train of laser beam (approximately 300 nm to 550 nm) to each adhesive joint 64. Each pulse train lasts approximately for a time duration ranging from 0.05 seconds to 0.2 seconds depending on the thickness of the adhesive joint. The pulse train is absorbed by the joint adhesive and is thermal degraded. Heat transferred to the workpiece 28, gripper pin 12, and gripper pin chassis 16 during this process is negligible.

Step 7: The workpiece 28 is removed from the fixture 11 (see FIG. 10). Having portions of thermally degraded adhesive 52 remaining on the contact surfaces of the workpiece 28 and gripper pins 12. In addition, uncured radiation responsive adhesive 20 may remain on surfaces not exposed to the curing radiant energy.

Step 8: The uncured radiation responsive adhesive 20 on the gripper pin chassis is first removed using an alcohol soaked rag. The residual, thermally degraded or residual adhesive substrate 52 on the contact surfaces of the gripper pins 12 is removed manually with either a scour pad or a pneumatic sander 50 with a scour pad attachment (FIG. 11). Alternatively, the residual can be removed automatically with a robot and the pneumatic sander. Thermally degraded or residual adhesive substrate 52 on the workpiece is either machined away in a subsequent set up or cleaned during the post processing of the machined workpieces.

The above example illustrates one way that the present invention 10 is applied, however it can be applied in different ways as well. The manner in which it is applied will be influenced by the specific characteristics of the application. Important influencing factors will include workpiece geometry and geometric variability, workpiece cycle time, part quality requirements, the capability of the machine tools carrying out the machining operations, and fixture reconfigurability and flexibility requirements.

Another embodiment takes into account alternative uses of additives that lead to curing light interference in which the adherent workpiece surfaces are relatively smooth and subject to small geometric variation. Examples of originating processes that would generate these types of workpiece surfaces would include rolling, extrusion, machining, powder processes, and die casting. The gripper pin chassis 16 are preferably stationary, and the nominal gap thickness between the gripper pins 12 and the workpiece would be 0.005 in. or less. A conventional curing lamp is used to cure the adhesive. The adhesive joint will have greater joint stiffness and virtually no heat transfer to the workpiece surface.

In cases of a thick adhesive joint (greater than 0.003 in.), four options exist for curing the joint. The first option is to use a pure, optically clear adhesive (easiest to cure), but the debonding process will rely on the heating of the adhesive-workpiece interface. This will require substantially more debonding light energy to debond the adhesive, and therefore may require a more powerful debonding light source or greater cycle time for the debonding process.

The second option is to use a lightly pigmented adhesive (less than 0.5% by weight colorant). This may require a stronger curing light source and/or slightly greater cycle time for the bonding process. However the debonding light source and process will remain approximately the same.

The third option is to use an equivalently pigmented adhesive (0.5% by weight colorant) and a much more powerful curing light source, such as a laser, than used with the first and second options.

The fourth option is to create a layered adhesive joint, including a thick layer (for example, 0.001 in. to 0.05 in. thick) of pure adhesive bonded to a thin layer (for example, 0.001 in. to 0.003 in. thick) of pigmented adhesive (0.5% by weight colorant). In this case, as a pre-processing step, a small coating of pigmented adhesive would be applied to the adherent workpiece surfaces, and semi-cured using a curing light source and bonding process equivalent to that used for bonding pigmented joints less than or equal to 0.003 in. The top surface of the joint will remain semi-cured due to oxygen inhibition. During the workpiece loading cycle, the semi-cured, pigmented adhesive will be brought into contact with the uncured pure adhesive. The uncured adhesive and the interface with the pigmented adhesive will then be cured as described previously.

If preferred, higher irradiance light sources can be used during the pre-processing step to decrease the curing cycle time. The small coating of pigmented adhesive can be also be cured by electron-beam bombardment (another form of radiation curing), or thermally cured (for example, by using an oven), or through the use of a chemical activator. Any of these processes can lead to a full cure of the pigmented adhesive below the adhesive-air interface, and insure that the top surface will remain semi-cured due to oxygen inhibition.

During the workpiece loading cycle, pure radiation responsive adhesive 20 is deposited on to the gripper pins 12. The workpiece 28 is then mounted against the locator pins 18 and locator pads 19, bringing the semi-cured adhesive into contact with the uncured pure adhesive. The pure adhesive is cured to bond to the gripper pin 12 and to cross polymerize with the semi-cured surface of the pigmented adhesive. This process can lead to a fully cured bond between the gripper pin 12 and the workpiece 28.

Experimentation has been conducted on adhesive joints that are 0.005 in. in thickness. In these cases, a 0.002 in to 0.003 in. layer of 0.5% pigmented adhesive is deposited on to the workpiece surface. Using a hand held light guide, the adhesive is semi-cured for 20 seconds using a low irradiance beam (<1.682 W/cm2). After the semi-cured, pigmented adhesive is brought into contact with the uncured, pure adhesive on the gripper pin, the adhesive joint was cured for 10 seconds using higher irradiance light (7.85 W/cm2) transmitted through the gripper pin. Joints created by this process routinely obtain strengths greater than 7480 psi. Further, the residual strength of the adhesive joints is approximately less than 460 N when subjected to debonding light (1270 W/cm2) for 0.2 seconds.

An alternative method of bonding provides sufficient holding strength could be achieved through the formation of adhesive bonds at the seams of the fixture-workpiece joints instead of at the area interfaces between the workpiece and fixture 11. The alternative embodiment provides for greater flexibility with regard to the transmission of the curing and debonding radiant energy.

In particular, simple direct beam, radiation transmission is sufficient for both the curing and debonding of the adhesive. As a consequence, the fixture 11 would not necessarily require optical transmission elements or any other form of beam steering device. Also, the alternative embodiment would provide greater flexibility with regard to the radiant energy source. Here, curing is performed by beams from a curing lamp, laser, or electron beam emitter. Further, debonding is performed by a laser or electron beam emitter. The radiant responsive structural adhesive may be a different formulation different than conventional adhesive used for light curable adhesives in the case of electron beam transmission.

Figure 14:
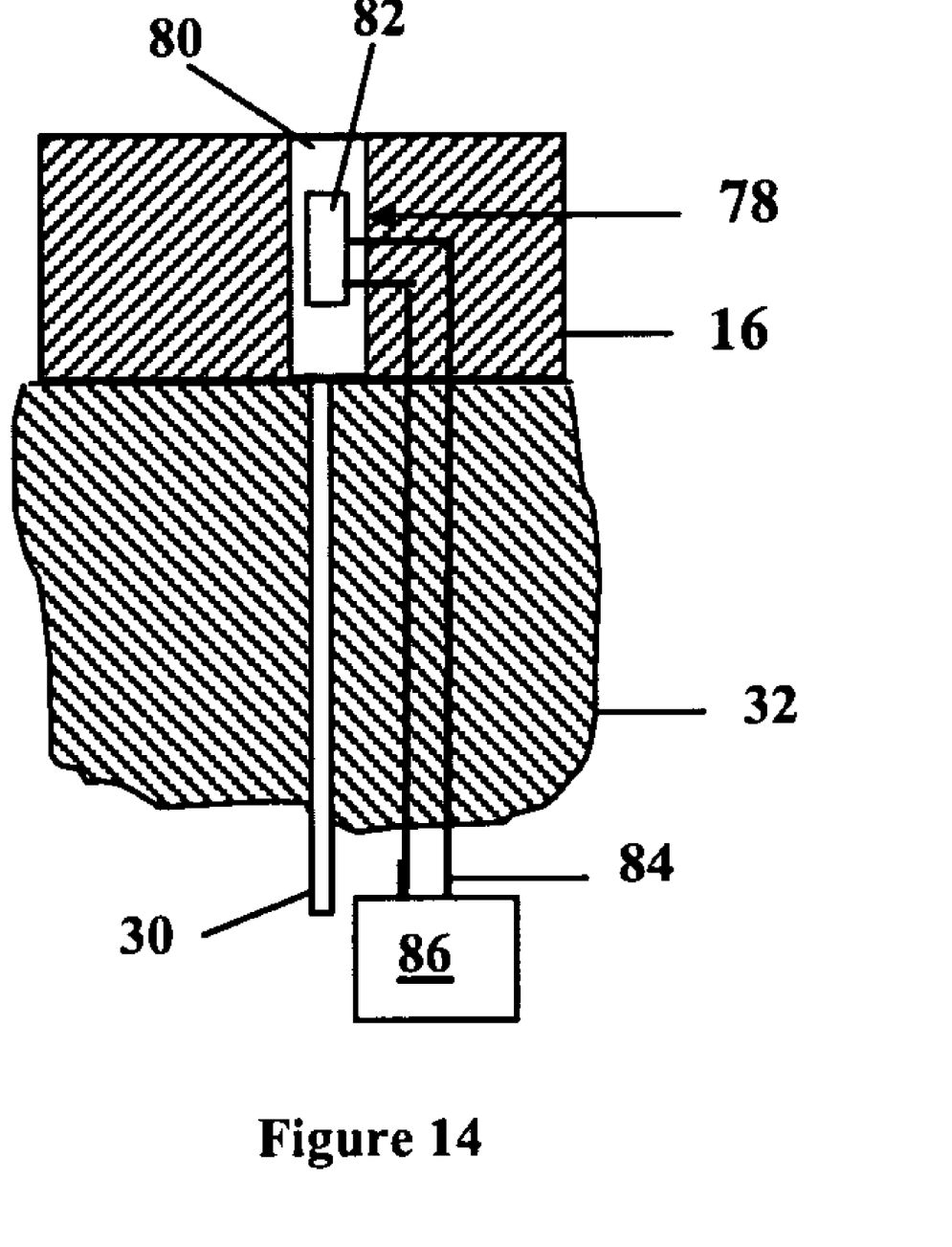
FIG. 14 is a partial cross-sectional view of an alternative embodiment of the radiant energy transmission system and gripper pin illustrating a gripper pin bulb.

An alternative radiant energy source is integrated into the gripper pin (FIG. 14). As discussed above, the gripper pin is preferably made of a material, such as sapphire, that is very strong, hard, and stiff, and can optically transmit radiant energy, such as light, in the UVA to near infrared wavelengths. The gripper pin is fabricated as a load bearing, gas-filled, metal halide bulb 78 with two electrodes 82. The gripper pin material is hollowed out to form the load-bearing bulb 80. Conventional electrodes 82 and gas are sealed within the load-bearing bulb by conventional means. The gas is any known gas that emits radiant energy in a wavelength range between 300 nm and 550 nm when excited by predetermined levels electrical voltage, such as metal halide gas. Electrical wires 84 connecting the electrodes 82 of the gripper pin bulb 78 are routed through the light guide chassis 32 and fixture subplate or tombstone (see FIG. 1) to a conventional power source 86.

During the adhesive bonding process, the power source generates sufficient voltage to the electrodes to excite the gas contained therein. The excited gas emits radiation, such as light, to cure the adhesive.

During the adhesive debonding process, laser light is transmitted through the gripper pin bulb, as described above for the solid gripper pin. However in this embodiment, the light is also transmitted through the gas filled within the bulb as well as the gripper pin material.

It will be apparent to those skilled in the art that other embodiments, improvements, details, and uses can be made consistent with the letter and spirit of the foregoing disclosure and within the scope of the patent, which is limited only by the following claims, construed in accordance with the patent law, including the doctrine of equivalents.

What is claimed is:

1. An adhesive work holding system for securing a workpiece for manufacturing comprising:
    a fixture defining an outer periphery capable of blocking transmissions of radiation;
    at least one discrete, radiation transmittive fixing surface disposed within said outer periphery and bonded to said fixture and having an adhesive receiving surface receiving an adhesive such that said radiation transmittive fixing surface is a load bearing surface;
    a radiant energy delivery system being capable of emitting radiant energy;
    said radiant energy delivery system being located adjacent to and in optical communication with said radiation transmittive fixing surface; and
    said radiation transmittive fixing surface is capable of transmitting said radiant energy emitted by said radiant energy delivery system toward the adhesive to activate the adhesive and bond the workpiece to said fixing surface.

2. The system according to claim 1, wherein
    said radiation transmittive fixing surface is capable of transmitting electromagnetic radiant energy; and said radiant energy delivery system is capable of emitting electromagnetic radiant energy.

3. The system according to claim 1, wherein
    said radiation transmittive fixing surface is capable of transmitting electron beam radiant energy; and
    said radiant energy delivery system is capable of emitting electron beam radiant energy.

4. The system according to claim 1, wherein said radiation transmittive fixing surface is made of material selected from the group consisting of sapphire, diamond, single crystal silicon dioxide, ruby, cubic zirconia, and zirconium oxide.

5. The system according to claim 1 wherein said radiant energy delivery system comprises a radiant energy source and network of optical channels.

6. The system according to claim 5 wherein said network of optical channels is integral to said fixture.

7. The system according to claim 6 wherein:
    said network of optical channels comprise an input end and output end;
    said output end being located adjacent to said radiation transmittive fixing surface;

said input end being located adjacent to said radiant energy source; and said radiant energy source being capable of emitting radiant energy.

8. The system according to claim 7, wherein said output end of said network of optical channels is capable of transmitting to said radiation transmittive fixing surface a stationary beam of radiant energy generated by said radiant energy source.

9. The system according to claim 7, wherein:

said radiant energy delivery system further comprises a radiant energy directional source in optical communication between said network of optical channels and said radiation transmittive fixing surface; and said radiant energy directional source being capable orienting the radiant energy transmitted by said network of optical channels on to said radiation transmittive fixing surface.

10. The system according to claim 5 wherein said radiant energy source is capable of transmitting radiant energy in a wavelength range between 300 nm and 1064 nm.

11. The system according to claim 5 for bonding the workpiece to said radiation transmittive fixing surface wherein said radiant energy source is capable of transmitting radiant energy in a wavelength range approximately between 300 nm and 550 nm.

12. The system according to claim 5 for separating the workpiece from said radiation transmittive fixing surface wherein said radiant energy is capable of transmitting radiant energy in a wavelength range approximately between 600 nm and 1064 nm.

13. The system according to claim 1 wherein said fixture further comprises mechanical locators to position the workpiece relative to said fixture.

14. The system according to claim 13 wherein said mechanical locators are capable of being disengaged, whereby said mechanical locators do not interfere with the manufacturing.

15. The system according to claim 13 wherein said mechanical locators are capable of being removed, whereby said mechanical locators do not interfere with the manufacturing.

16. The system according to claim 13 wherein said mechanical locators are capable of being retracted, whereby said mechanical locators do not interfere with the manufacturing.

17. The system according to claim 5 wherein said network of optical channels are selected from the group consisting of internally reflective light guides, reflective members, mirrors, and lenses.

18. The system according to claim 1 wherein:

said radiation transmittive fixing surface are integral; and said integral radiant energy delivery system comprises, a sealed load-bearing bulb made of material selected from the group consisting of sapphire, diamond, single crystal silicon dioxide, ruby, cubic zirconia, and zirconium oxide;

electrodes disposed within said sealed load-bearing bulb;

a gas capable of emitting radiant energy in a wavelength range between 300 nm and 550 nm disposed within said sealed load-bearing bulb; and a plurality of electrical wires connected to said electrodes.

19. The system according to claim 1 wherein said radiation transmittive fixing surface is further defined as being shaped to conform with an adherent surface of the workpiece.

20. The system according to claim 1 wherein said radiation transmittive fixing surface is further defined as a wave guide or lens capable of redirecting radiation from said radiant energy delivery system.

21. An adhesive work holding system for securing a workpiece for manufacturing comprising:

a fixture;

a radiation transmittive fixing surface supporting a workpiece on said fixture for allowing work to be performed on the workpiece;

a radiant energy delivery system comprising a radiant energy source being capable of emitting radiant energy and a network of optical channels being capable of transmitting radiant energy;

said radiant energy delivery system being located adjacent to and in optical communication with said radiation transmittive fixing surface via said optical channels; and said radiation transmittive fixing surface is capable of transmitting said radiant energy emitted by said radiant energy source.

* * * * *